United States Patent
Borton et al.

(10) Patent No.: US 6,957,661 B1
(45) Date of Patent: Oct. 25, 2005

(54) VALVE WITH PRESSURIZATION RATE REDUCTION DEVICE

(75) Inventors: Jeffre Allen Borton, North Tonawanda, NY (US); David Michael Lechner, Clarence, NY (US); Dennis Herman Sattelberg, North Tonawanda, NY (US)

(73) Assignee: Harsco Technologies Corporation, Fairmont, MN (US)

( * ) Notice: Subject to any disclaimer, the term of this patent is extended or adjusted under 35 U.S.C. 154(b) by 256 days.

(21) Appl. No.: 10/392,134

(22) Filed: Mar. 19, 2003

(51) Int. Cl.$^7$ .............................................. F16K 1/54
(52) U.S. Cl. ............ 137/550; 137/630.15; 137/630.18; 137/630.22; 137/630.14
(58) Field of Search ...................... 137/630.11, 630.14, 137/630.15, 630.18, 630.22, 550

(56) References Cited

U.S. PATENT DOCUMENTS

| | | | |
|---|---|---|---|
| 378,140 A * | 2/1888 | Lozon ................... | 137/630.14 |
| 401,647 A | 4/1889 | Foster | |
| 723,803 A | 3/1903 | Abeling | |
| 927,683 A | 7/1909 | Schuermann | |
| 1,064,565 A | 6/1913 | Thurber | |
| 1,230,499 A | 6/1917 | McDiMatheson | |
| 1,432,527 A | 10/1922 | Burdett | |
| 1,716,183 A | 6/1929 | Possons | |
| 1,833,653 A | 11/1931 | Martin | |
| 1,870,293 A | 8/1932 | Miller | |
| 1,875,679 A | 9/1932 | Thompson | |
| 2,202,971 A | 6/1940 | Vedoe | |
| 2,367,662 A | 1/1945 | Baxter et al. | |
| 2,446,626 A | 8/1948 | Baxter et al. | |
| 3,001,551 A | 9/1961 | Wyser | |
| 3,012,584 A | 12/1961 | DuPerow et al. | |
| 3,117,595 A | 1/1964 | Broecker et al. | |
| 3,211,419 A | 10/1965 | Lohr | |
| 3,347,270 A | 10/1967 | Cranage | |
| 3,348,561 A | 10/1967 | MacLennan | |
| 3,624,753 A * | 11/1971 | Brumm ................. | 137/630.14 |
| 3,809,121 A | 5/1974 | Harris | |
| 3,841,353 A | 10/1974 | Acomb | |
| 4,172,468 A | 10/1979 | Ruus | |
| 4,549,716 A | 10/1985 | Warren | |
| 4,672,203 A | 6/1987 | Holkeboer | |
| 5,037,066 A | 8/1991 | Kerger et al. | |
| 5,141,027 A * | 8/1992 | Magnasco .............. | 137/614.17 |
| 5,186,393 A | 2/1993 | Yie | |
| 5,704,397 A | 1/1998 | Lu | |
| 6,125,846 A | 10/2000 | Bathe et al. | |
| 6,491,056 B2 * | 12/2002 | Gibb ..................... | 137/630.14 |
| 2002/0056479 A1 | 5/2002 | Kroupe et al. | |

* cited by examiner

*Primary Examiner*—Stephen M. Hepperle
(74) *Attorney, Agent, or Firm*—David C. Jenkins; Eckert Seamans Cherin & Mellott, LLC

(57) ABSTRACT

A valve includes a housing assembly, a stem assembly and a surge suppression device. The surge suppression device includes an initial flowpath between the valve inlet and the outlet, a primary flowpath between the inlet and the outlet, a first valve assembly and a second valve assembly. The first valve assembly is coupled to the stem assembly and threadably engages the housing assembly and structured to move between a first, closed position wherein the primary flowpath is blocked and a second, open position wherein the primary flowpath is not blocked. The second valve assembly is threadably coupled to the housing assembly and structured to move between a first, closed position wherein the initial flowpath is blocked and a second, open position wherein the initial flowpath is not blocked.

24 Claims, 4 Drawing Sheets

VALVE WITH PRESSURIZATION RATE REDUCTION DEVICE

BACKGROUND OF THE INVENTION

1. Field of the Invention

This application relates to a valve for a high pressure system and, more specifically, to a valve for use with a high pressure cylinder that incorporates a devices structured to reduce the rate of pressurization of a downstream device.

2. Background Information

Valves coupled to a high pressure gas cylinders are well known in the art. Such valves typically open in a single stage. That is, when a user operates an opening mechanism, typically a handle or knob, a valve assembly blocking the flowpath between the valve inlet and outlet moves from a closed position to an open position. When the flowpath is initially opened there is adiabatic compression of the gas through the valve and any downstream devices. While this adiabatic compression of the gas does not effect the valve, it has been determined that certain devices coupled to the downstream side of the valve may be adversely effected. For example, a downstream device may ignite and burn.

One area of special concern is cylinders which hold oxidizers such as, but not limited too, high pressure oxygen cylinders used in medical applications or cylinders containing $NO_2$, hereinafter "oxygen cylinders." When the oxygen cylinder is used in a medical application, the downstream device coupled to the valve is often a regulator. A regulator steps down the pressure of the oxygen so that the oxygen may be supplied at a breathable pressure. However, with respect to the possibility of a fire, when a critical amount of oxygen, fuel, and heat are combined, a fire will result. The exact critical amount of each of these essential components of a fire differ based upon the characteristics of the regulator, or any other downstream device. That is, by way of example only, a regulator may have a set of characteristics, such as, but not limited to, being made from a specific material, having a thin wall, a specific flowpath and being exposed to a supersonic flow of pure oxygen. Given these characteristics, a properly designed regulator should not ignite as the critical amounts of oxygen, fuel, and heat required for a fire should not be present. However, if any one of the characteristics were changed, again by way of example only, such as by changing the material from which the regulator is constructed, the combination of oxygen, fuel, and heat may be enough to ignite the new material.

In the past, the material of choice for constructing regulator bodies was brass. Brass regulators, in an almost pure oxygen environment, resist burning at a pressure as high as 10,000 psig. Accordingly, when such brass regulators were used with prior art valves there were few, if any, fires related to adiabatic compression. In an effort to reduce the weight of the regulators, some regulator bodies are now made from aluminum and other non-metallic components. Aluminum can burn, in an almost pure oxygen environment, at a pressure as low as 25 psig. On rare occasions, the newer aluminum regulators have caught on fire immediately after the valve has been opened. Such fires are extremely dangerous, first because metal fires, and especially aluminum fires, are extremely hot and second, because a medical oxygen cylinder is typically close to a patient or a caregiver. While such regulator fires have been related to the pressure surge that occurs when the valve is opened, the ignition mechanism is unknown. Certainly, the oxygen enriched environment enhances the chance of a fire once ignition occurs.

While there may be more than one cause of ignition, or a combination of causes, one theory is that the adiabatic compression of the gas within the attached aluminum regulator following the opening of the valve causes a rise in the temperature of the gas within the regulator. This rise in temperature, along with the geometry of the regulator, the shape of the flowpath, and other characteristics of the regulator, may be enough to allow the aluminum regulator to ignite. The chance of igniting the regulator or, if the valve is used for a different purpose, any other downstream device, is increased due to the enriched oxygen environment. This type of ignition is hereinafter identified as "heat of compression ignition."

Accordingly, one theory as to how to prevent heat of compression ignition is to suppress the adiabatic compression of the gas. Devices structured to reduce the adiabatic compression of the gas are disclosed in U.S. Pat. Nos. 2,367,662, 3,841,353, 4,172,468 and application 2002/0056479 A1. These devices are structured to limit the initial flow of fluid through the valve. Each of these devices, however, have deficiencies. The U.S. Pat. Nos. 2,367,662 and 4,172,468 devices, for example, are separate units that are disposed between the valve and downstream equipment. As such, there is no guarantee that the device will always be used. The U.S. Pat. Nos. 3,841,353 and 2002/0056479 A1 devices are incorporated into the valve, but rely on springs to position the valve element. Such springs may wear out over time or be lost during maintenance of the valve. The device disclosed in application 2002/0056479 A1 also has the disadvantage of having the primary valve close prior to the secondary valve. Thus, it is possible that a user attempting to close the valve, and who may be guided by the audible sound of gas flowing through the primary valve, will only close the primary valve while allowing the secondary valve to remain open. Additionally, certain valves include markings on the outer portion of the housing indicating the position of the valve assembly. In valves that rely on springs for positioning the valve assembly, degradation of the spring may cause the valve assembly to shift relative to the external markings thereby making the markings irrelevant or misleading.

Another suspected cause of ignition of a regulator, or any other downstream device attached to an oxygen cylinder, is particulate matter disposed within the oxygen cylinder. Particulate matter may pass through, or into, the downstream device at high speed upon opening the valve. That is, the opening of a valve may cause a momentary supersonic fluid flow through, or into, the downstream device. A particle within the oxygen cylinder may be picked up by this high speed flow and pass into the downstream device. Again, the chance of ignition depends on the characteristics of the regulator or downstream device. For example only, a downstream device having a non-aerodynamic flowpath with thin protrusions extending into the flowpath, and which are made from a material having a low ignition temperature, is more likely to suffer an ignition due to particle impingement than a device with an aerodynamic flowpath. That is, with a non-aerodynamic flowpath, the particle is more likely to impinge upon the material in such a way as to transfer energy, and therefore heat, to the device housing. This heat, along with the enriched oxygen environment and other characteristics of the device, may cause the particles, and subsequently the device, to catch on fire. This type of ignition is hereinafter identified as "particle impact ignition."

Additionally, with respect to particle impact ignition, the chance of such an particle impact ignition is increased if the number of particles passing through the valve is increased. A gas cylinder is typically funnel shaped at the end where the valve is attached. This shape is conducive to creating a gas stream that, depending upon the orientation of the cylinder, draws particles directly into the valve inlet. That is, it is less likely that a taller cylinder in vertical orientation will pass particles through a valve than a shorter cylinder in a horizontal orientation. Still, any cylinder that is contaminated with particulate matter may pass those particles into or through the valve.

SUMMARY OF THE INVENTION

The present invention provides a valve that opens in two stages; a low flow stage, then a high flow stage. The valve may also include a filter in the low flow stage flowpath. The valve has a housing with an inlet passage, an outlet passage and containing a first and second valve assemblies. The first valve assembly acts within a primary flowpath, which is the high flow stage flowpath, between the inlet passage and the outlet passage. The second valve assembly acts within an initial flowpath, which is the low flow stage flowpath, between the inlet passage and the outlet passage. The initial flowpath includes a micro-passage having a cross-sectional area of less than about 0.0000283 in$^2$. A single operating device, such as a knob, wrench or torque handle, operates both the first and second valve assemblies. When the operating device is actuated, the second valve assembly is moved between the open and closed position prior to the first valve assembly moving between the open and closed position. Thus, as compared to the prior art valve, when the initial flow path is opened, fluid flows at a lower flow rate through the micro-passage thereby pressurizing the outlet passage over a longer period of time. This slower pressurization rate prevents or reduces the adiabatic compression of the gas from occurring when the primary flowpath is opened. Both the first and second valve assemblies are coupled, directly or indirectly, to the housing only by a threaded coupling means. As such, the position of the valve assemblies may be precisely controlled. Because the location and pitch of the threads on both the first and second valve assemblies may be precisely controlled, the valve assemblies may be structured so that the second valve assembly is moved from the closed position to the open position upon turning the operating device by more that 360 degrees. Thus, a user will typically release and re-grip the operating device while the second valve assembly is in the open position, but before the first valve assembly is acted upon. This delay will ensure that the pressure across the initial flowpath is in equilibrium. Additionally, there is a filter disposed between the micro-passage and the outlet. An additional tubular member may extend from the housing about the inlet passage. The filter and tubular member are structured to block any particles that are picked up by the fluid flow when the valve is opened from passing through the valve.

Accordingly, the present invention is structured to reduce the chance of igniting a fire in a device downstream of the valve, such as a regulator on an oxygen cylinder, by addressing two of the possible sources of combustion, heat of compression ignition and particle impact ignition. First, the initial flowpath, by virtue of the size of the micro-passage, prevents an intense adiabatic compression of the gas upon opening of the initial flowpath. The fluid, and attendant pressure, that passes through the initial flowpath significantly reduce, or eliminate, the adiabatic compression of the gas created when the primary flowpath is opened. Thus, the chance of heat of compression ignition occurring is reduced or eliminated. Second, any particulate matter picked up by the fluid flow when the initial flowpath is opened and which travels into the valve is trapped by the filter. Additionally, the tubular member moves the valve inlet away from the funnel shaped end of the cylinder, thereby reducing the chance of particulate matter flowing directly into the valve. Thus, the chance of particle impact ignition is reduced or eliminated.

It is an object of this invention to provide a valve that incorporates a device structured to reduce and control the rate of pressurization through the valve.

It is a further object of this invention to provide a valve that incorporates a pressure rate reduction device that can be precisely controlled.

It is a further object of this invention to provide a valve having an initial flowpath and a primary flowpath and wherein, when the valve is closed, the initial flowpath is closed prior to primary flowpath.

It is a further object of this invention to provide a pressure rate reduction device that includes a particle filter.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, any descriptive directional words, such as "upper" and "lower," are used in reference to the Figures only whereas the valve may be oriented in any direction.

Figure 1:
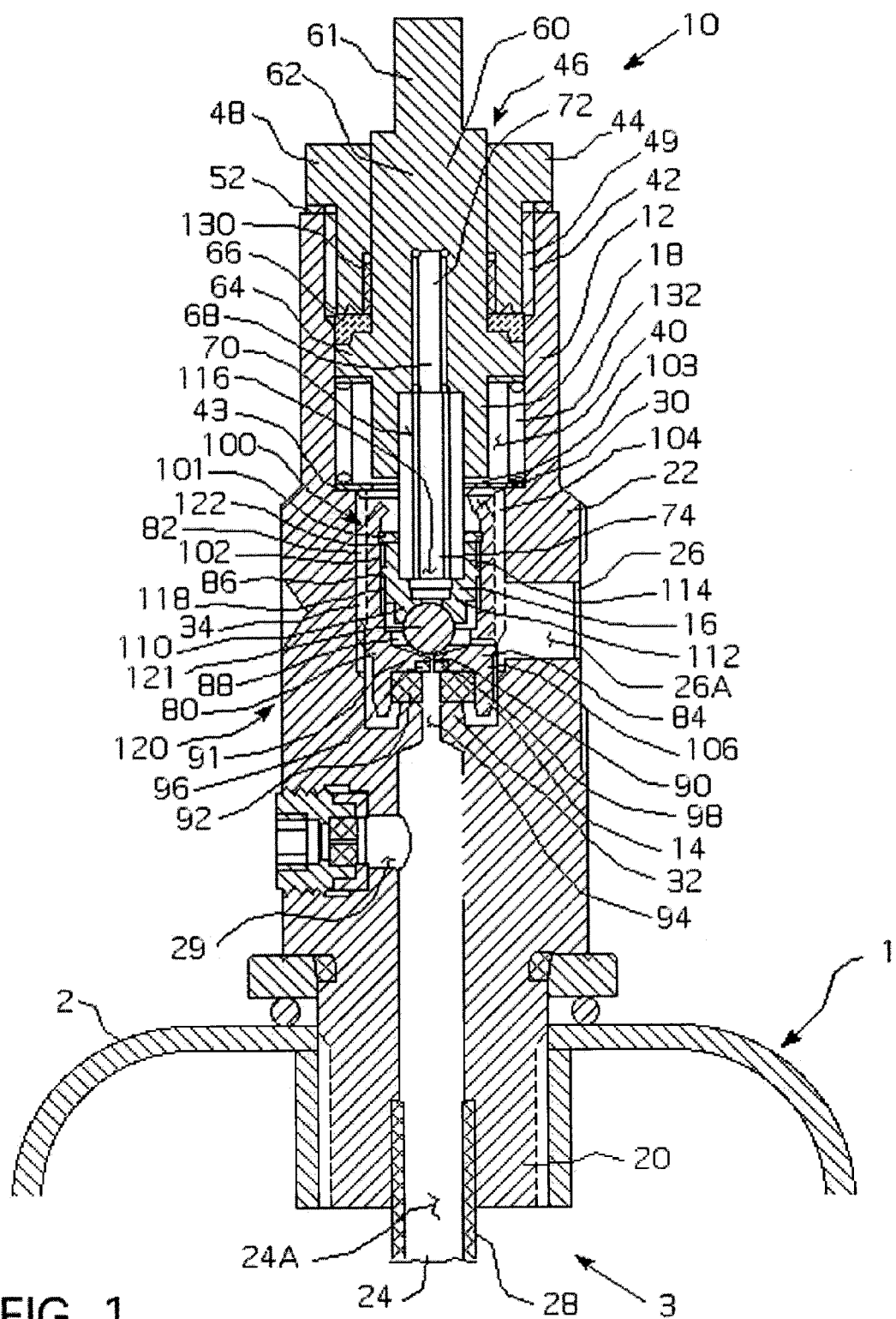
FIG. 1 is a cross-sectional view of the valve in the fully closed position.
Figure 2:
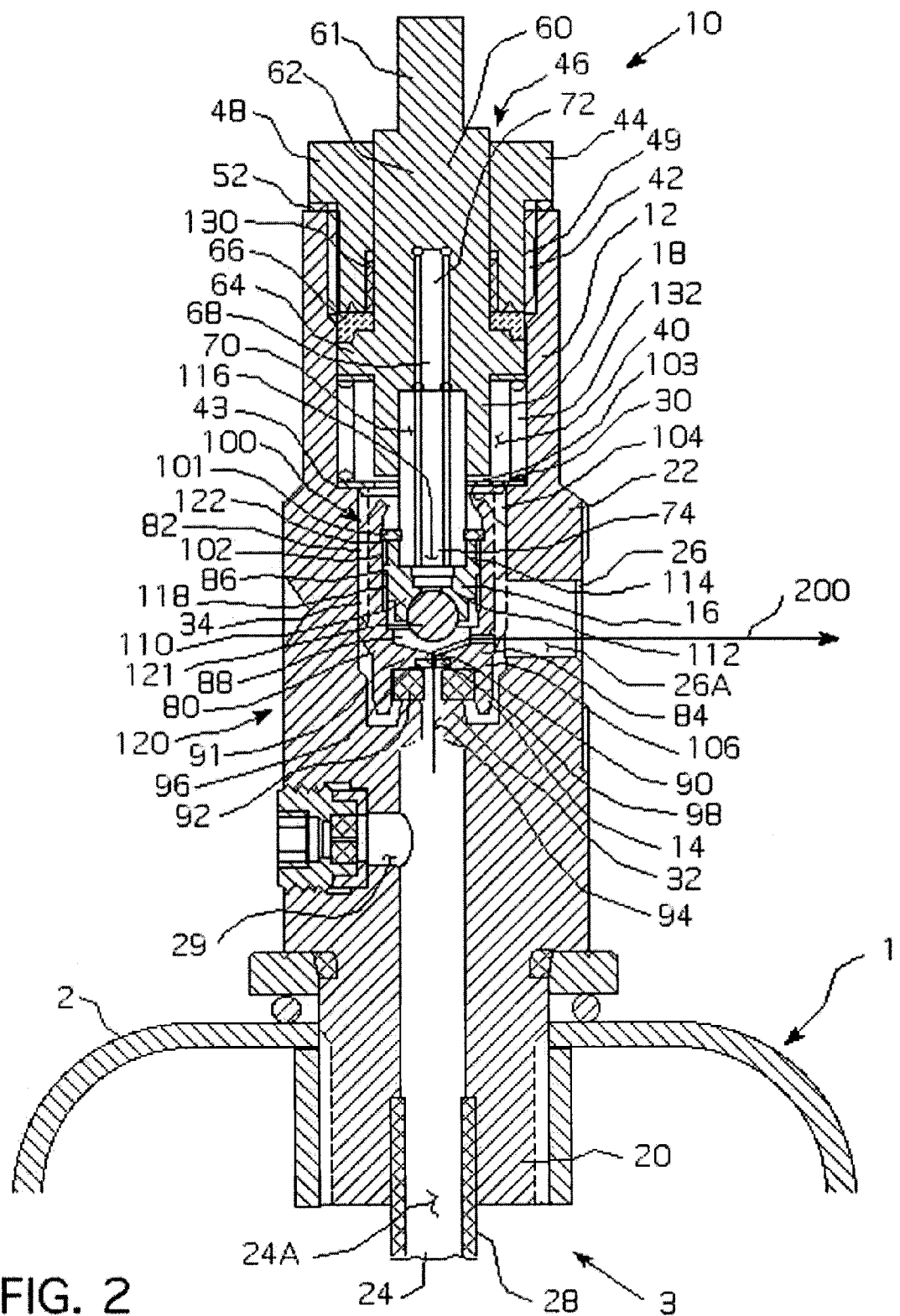
FIG. 2 is a cross-sectional view of the valve with the initial flowpath open.
Figure 3:
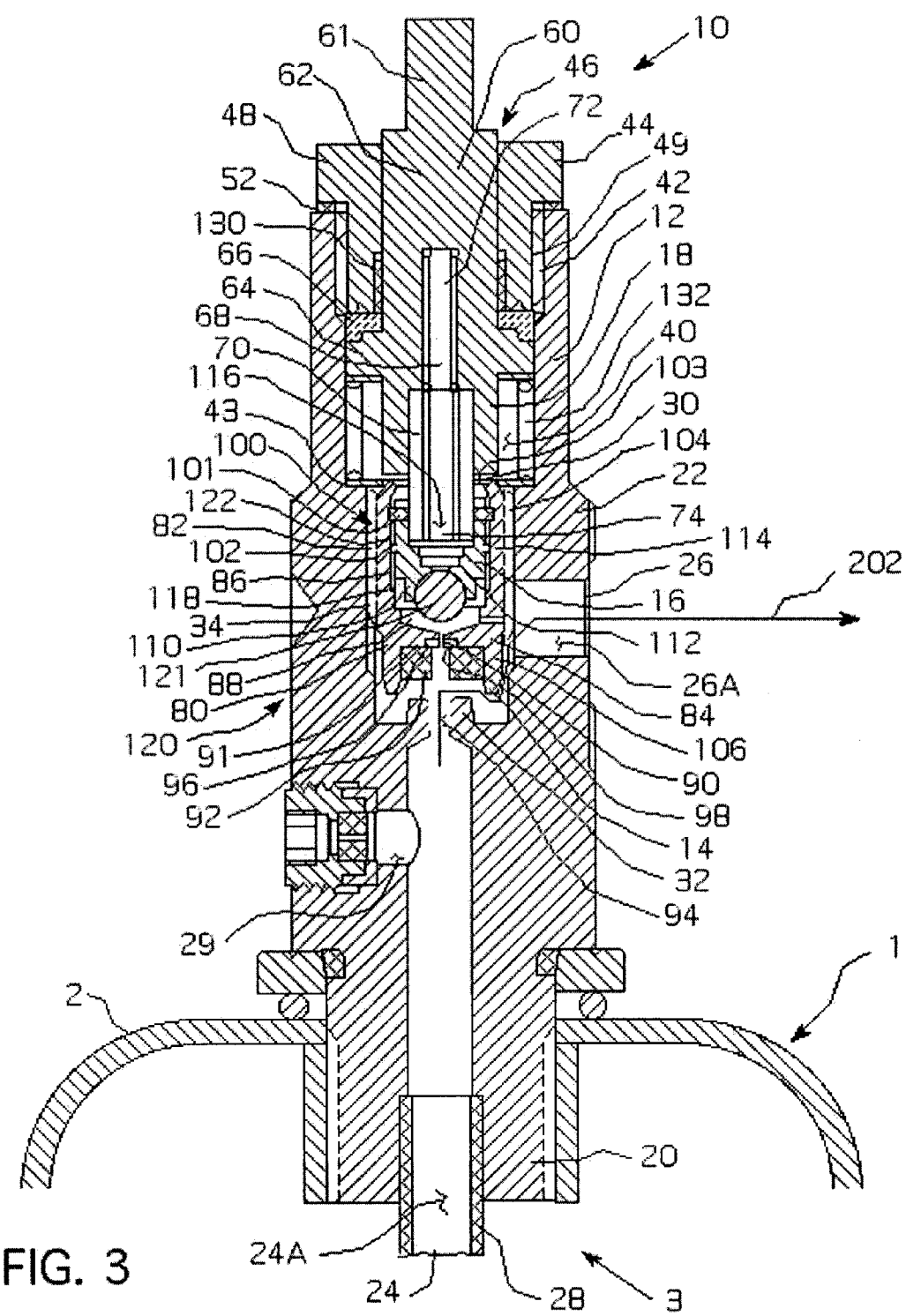
FIG. 3 is a cross-sectional view of the valve in the fully open position.

As shown in FIGS. 1–3, the valve 10 includes an elongated housing assembly 12, a first valve assembly 14, a second valve assembly 16, and a stem assembly 18. The housing assembly 12 includes a threaded attachment end 20, a generally square portion 22, and a generally cylindrical portion 23. The attachment end 20 is structured to engage a compressed gas cylinder 1. The cylinder 1 includes a rigid housing 2 having at least one opening 3 therethrough. The valve 10 is coupled to the cylinder 1 at the opening 3. The generally square portion 22 includes an outlet 26 which is at the end of an outlet passage 26a. The outlet passage 26a extends in a direction perpendicular to the axis of the housing assembly 12. The attachment end 20 includes an inlet that is at the end of an inlet passage 24a. The inlet passage 24a extends, generally, along the axis of housing assembly 12. Additionally, a tubular member 28 is mounted within the inlet passage 24a and extends beyond the inlet 24. The generally square portion 22 may also include a safety port 29 as is known in the art.

Within the housing assembly square portion 22 is a valve chamber 30. The valve chamber 30 is in fluid communication with both the inlet passage 24a and the outlet passage 26a. Within the valve chamber 30 is a generally flat landing 32 extending in a plane perpendicular to the axis of housing assembly 12. The inlet passage 24a passes through the landing 32. The valve chamber 30 further includes internal threads 34 extending from the housing assembly 12 into the valve chamber 30.

Within the housing assembly generally cylindrical portion 23 is a stem chamber 40. The stem chamber 40 and the valve chamber 30 may be in fluid communication. The distal end of the stem chamber 40 is open and includes a set of internal threads 42. The proximal end of the stem chamber 40 includes a ledge 43 extending partially into the stem chamber 40. A bonnet member 44 having a central opening 46, an upper flange 48 and a lower threaded portion 49 is structured to engage the housing assembly generally cylindrical portion 23. That is, the lower threaded portion 49 has external threads structured to engage the stem chamber internal threads 42. The bonnet flange 48 has a diameter that is greater than the generally cylindrical portion 23 and, as such, is structured engage the distal end of the cylindrical portion 23. A seal 52 is preferably disposed between the bonnet 44 and the housing assembly 12 at the distal end of the cylindrical portion 23.

The stem assembly 18 is disposed within the stem chamber 50. The stem assembly 18 includes an elongated body 60, having a handle portion 61 and a cylindrical portion 62, a flange 64, a first stem seal 66, and a drive rod 68. The handle portion 61 is structured to operate in conjunction with a handle (not shown) which may be a knob, a wrench, or other such device. Within the stem assembly body 60 is an internal chamber 70 The drive rod 68 has a first end 72 and a second end 74. The drive rod first end 72 is disposed within the internal chamber 70. Preferably, both the internal chamber 70 and the drive rod 68 have a hexagonal cross-section. The drive rod second end 74 is structured to extend into the valve chamber 30. The first stem seal 66 is disposed on the distal side of the flange 64 and about the stem assembly cylindrical portion 62.

The first valve assembly 14 includes an elongated, generally cup-shaped body 80 that has a plurality of threads 82, a bottom disk 84, and a sidewall 86 that defines an upwardly opening cavity 88. The bottom disk 84 includes a micro passage 90 that is, preferably, centrally disposed on the disk. As described below, the micro-passage 90 provides an initial flowpath 200 that pressurizes the downstream side of the valve 10. Thus, the size of the micro-passage 90 varies depending upon the pressure of the gas, the time desired to fill the downstream device and the volume of the downstream device. For example, to pressurize a two cubic-centimeter volume to a pressure of 2200 psig in about, or just above, one second, the micro-passage 90 should have a cross-sectional area that is between about 0.00000707 and 0.0000283 in$^2$, and is more preferably about 0.0000126 in$^2$. The first valve assembly 14 further includes a resilient seal member 92. The first valve assembly seal member 92 is a torrus with a central opening 94. The first valve assembly seal member 92 is disposed on the bottom side of the disk 84 and the central opening 94 is aligned with the micro-passage 90. The first valve body 80 further includes a recess 96 disposed adjacent to the first valve assembly seal member 92 and centrally aligned, and in fluid communication with, the micro-passage 90. A filter 98 is disposed in the recess 96 between the first valve assembly seal member 92 and the micro-passage 90. The filter 98 has a mesh size of about 30 microns. As described hereinafter, an initial flowpath 200 extends through the filter 98. The first valve assembly 14 further includes a stop means 100 that is structured to extend into the upwardly opening cavity 88. In the preferred embodiment, the stop means includes a ring member 101, or washer, which is captured by a crimped upper edge 103 of the upwardly opening cavity 88. That is, the upper edge 103 initially has the same inner diameter as the upwardly opening cavity 88. However, during assembly, as explained below, after a ring member 101 is inserted into the upwardly opening cavity 88, the upper edge 103 is crimped thereby capturing the ring member 101.

Figure 4:
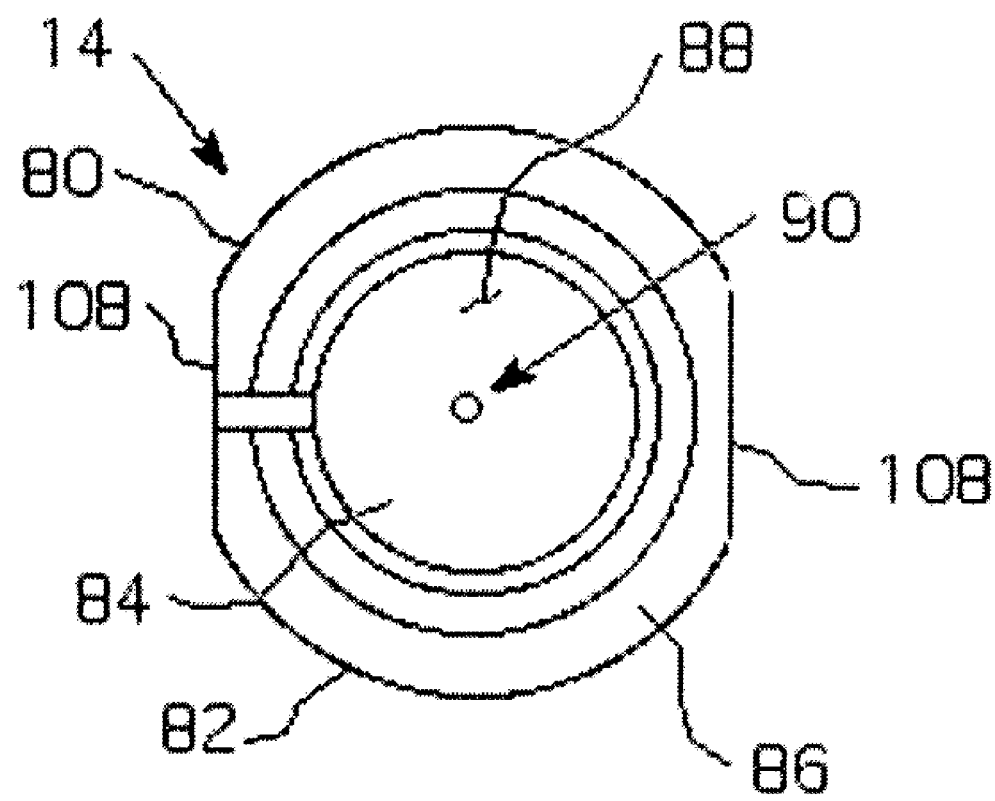
FIG. 4 is a top view of the first valve assembly body.

The upwardly opening cavity 88 further includes a threaded inner surface 102. Additionally, the outer surface of the first valve body 80 includes an outer threaded surface 104. The first valve body outer threaded surface 104 is structured to engage the internal threads 34 extending from the housing assembly 12 into the valve chamber 30. The first valve body 80 may further include a lateral opening 106 extending from the upwardly opening cavity 88 through the sidewall 86. Additionally, as shown on FIG. 4, the outer surface of sidewall 86 may have one or more flat regions 108.

The second valve assembly 16 includes an elongated, generally cup-shaped body 110 that has a bottom disk 112, and a sidewall 114 defining an upwardly opening cavity 116. The sidewall 114 also has external threads 118 that are structured to engage the upwardly opening cavity threaded inner surface 102. Accordingly, the diameter of the second valve assembly body 110 is about the same size as upwardly opening cavity 88. The second valve upwardly opening cavity 116 is structured to engage the drive rod second end 74 and, preferably, has a hexagonal cross-section. The second valve assembly 16 further includes a sealing member 120. In a preferred embodiment, the second valve assembly sealing member 120 is a resilient sphere 121. The sealing member 120 is disposed on the lower side of the bottom disk 112.

The valve 10 is assembled as follows. First, the second valve assembly 16 is inserted into the first valve upwardly opening cavity 88. To accomplish this, the stop means 100 must not be engaged. Thus, if the stop means is, for example a clip ring (not shown), the clip ring must be removed. In the preferred embodiment, the second valve assembly 16 is inserted into the first valve upwardly opening cavity 88 prior to crimping the upper edge 103. To insert the second valve assembly 16 into the first valve upwardly opening cavity 88, the second valve assembly external threads 118 engage the first valve assembly upwardly opening cavity threaded inner surface 102 and the second valve assembly 16 is rotated into the upwardly opening cavity 88. Once the second valve assembly 16 is inserted into the first valve upwardly opening cavity 88, the stop means 100 is engaged. In the preferred embodiment this is accomplished by inserting the ring member 101 into the upwardly opening cavity 88 and then crimping the upper edge 103 of the upwardly opening cavity 88. In this configuration, the second valve assembly sealing member 120 is aligned with the micro-passage 90. The first valve upwardly opening cavity 88 has a sufficient length to allow the second valve assembly 16 to move between a first, closed position, wherein the second valve assembly sealing member 120 sealingly engages the micro-passage 90, and a second, open position, wherein the second valve assembly sealing member 120 is spaced from the micro-passage 90. The second valve assembly 16 may further be moved into a third position wherein the second valve assembly 16 contacts the stop means 100. A low-friction coating 122 may be applied to either or both the second valve assembly external threads 118 and the first valve assembly upwardly opening cavity threaded inner surface 102 to reduce the coefficient of friction.

The first valve assembly 14 is then inserted into the valve chamber 30 and the first valve assembly outer threaded surface 104 engages the valve chamber internal threads 34. In this configuration, the first valve assembly seal member 92 is aligned with the landing 32 and the valve assembly seal member central opening 94 is aligned with the inlet passage 24a. The valve chamber internal threads 34 have a sufficient length to allow the first valve member to move between a first, closed position wherein the first valve assembly seal member 92 sealingly engages the landing 32 on and about the periphery of the inlet passage 24a, and a second, open position, wherein the first valve assembly seal member 92 is spaced from the landing 32.

The stem assembly 18 is inserted into the bonnet central opening 46 so that the handle portion 61 extends out of the bonnet opposite the bonnet threaded portion 49. In this configuration, the stem assembly cylindrical portion 62 is disposed within the bonnet central opening 46 and the stem assembly first stem seal 66 contacts the bottom of the bonnet threaded portion 49. A second stem seal assembly 130 is disposed between the stem assembly cylindrical portion 62 and the bonnet central opening 46. Additionally, a spring 132, such as a coil spring, may be disposed in the stem chamber 40. The spring 132 contacts the stem chamber ledge 43 and, following insertion of the stem assembly 18 into the stem chamber 40 as described below, the stem assembly flange 64. Thus, the spring 132 biases the stem assembly 18 against the bonnet member 44 and thereby maintains the second stem seal assembly 130 in place. The spring 132 does not affect the position of either the first or second valve assemblies 14, 16 relative to the housing assembly 12.

The bonnet member 44 is coupled to the housing assembly 12 at the distal end of the stem chamber 40 by threading the bonnet lower threaded portion 50 into the stem chamber internal threads 42. Thus, the stem assembly 18 is disposed in the stem chamber 40 and the drive rod second end 74 extends into the valve chamber 30 and, more specifically, into the second valve assembly upwardly opening cavity 116. Accordingly, rotation of the stem assembly handle portion 61 causes the drive rod 68 to rotate, which in turn causes the second valve assembly 16 to rotate. Rotation of the second valve assembly 16 causes the second valve assembly 16 to move between the first, closed and second, open positions. As described below, rotation of the handle 61 further causes rotation of the first valve assembly 14 and moves the first valve assembly between the first, closed and second, open positions. Due to the low friction coating 122 on either or both of the second valve assembly external threads 118 and the first valve assembly upwardly opening cavity threaded inner surface 102, the second valve assembly 16 will rotate before the first valve assembly 14. Alternatively, if the low friction coating 122 is not applied, the second valve assembly 16 is structured to rotate before the first valve assembly 14. That is, because the second valve assembly 16 has a smaller diameter than the first valve assembly 14, the second valve assembly external threads 118 have less surface area, which therefore produces less friction, than the first valve assembly outer threaded surface 104. The lower amount of friction allows the second valve assembly 16 to rotate prior to the first valve assembly 14.

Assuming that both the first valve assembly 14 and the second valve assembly 16 are both in the first, closed positions, rotating the handle 61, typically in a counter-clockwise direction, will move the second valve assembly 16 from the first position to the second position, further counter-clockwise rotation of the handle 61 will move the second valve assembly 16 into the third position wherein the second valve assembly 16 contacts the stop means 100. After the second valve assembly 16 contacts the stop means 100, the second valve assembly 16 cannot move relative to the first valve assembly 14 and further counter-clockwise rotation of the handle 61 causes the first valve assembly 14 to rotate within the valve chamber 30 and move between the first valve assembly first, closed position and the second, open position. As described hereinbefore, the second valve assembly 16 moves relative to the first valve assembly 14 prior to the first valve assembly 14 moving relative to the valve chamber 30 either because of the low friction coating 122 or because the first valve assembly 14 has a greater diameter, and therefore produces more friction that resists movement, than the second valve assembly 16.

Conversely, once both the first valve assembly 14 is in the second, open position and the second valve assembly 16 is in the third position, clockwise rotation of the handle 61 will cause the second valve assembly 16 to move from the third position, through the second position, and into the first, closed position. Once the second valve assembly 16 is in the first, closed position where the second valve assembly sealing member 120 sealingly engages the micro-passage 90, further rotation of the handle 61 causes the first valve assembly 14 to rotate within the valve chamber 30 and move between the second, open position and the first, closed position. Accordingly, the second valve assembly 16 again moves prior to the first valve assembly 14.

Thus, in operation, the valve 10 is coupled to a high pressure gas cylinder 1. The gas cylinder 1 typically is funnel shaped at the end where the valve 10 is attached. With the first valve assembly 14 and the second valve assembly 16 both in the first, closed positions, gas does not flow through the valve 10. When a user operates the handle 61 to open the valve 10, an initial flowpath 200 allows gas to flow through the inlet 24 and inlet passage 24a, through the first valve assembly seal member central opening 94, through the filter 98, through the micro-passage 90, and into the first valve member upwardly opening cavity 88 and the valve chamber 30. From the first valve member upwardly opening cavity 88 and the valve chamber 30, gas travels, mainly, through the lateral opening 106 and exits the valve through the outlet passage 26a and outlet 26. Some gas in the first valve member upwardly opening cavity 88 and the valve chamber 30 may bleed between the first valve assembly 14 and the second valve assembly 16 and thereby reach the outlet passage 26a and outlet 26. Because the micro-passage 90 has a cross-sectional area of about 0.0000126 in$^2$, the flow of gas, and therefore the pressure surge, is reduced compared to prior art valves. The initial flow of gas, however, will pressurize the down stream side of the valve 10 and any equipment attached thereto. Additionally, because tubular member 28 effectively moves the inlet 24 moves the inlet 24 into the cylinder 1 as opposed to being at the very top of the cylinder 1, the gas flow is less likely to pick up particles and move those particles into the valve 10. That is, the spacing of the inlet 24 away from the top of the cylinder 1 creates a more turbulent gas flow within the cylinder 1 and as such, particles are less likely to enter the valve 10. Any particles having a size greater than 30 microns will be captured by the filter 98 in the initial flowpath 200.

When the handle 61 is rotated further in the counter-clockwise direction and the first valve assembly 14 moves from the first, closed position to the second, open position as described hereinbefore, fluid from within the cylinder 1 flows through a primary flowpath 202 directly from the inlet passage 24a, through the valve chamber 30 and through the outlet passage 26a. That is, when the first valve assembly 14 is in the second, open position, the fluid in the cylinder 1 does not flow through the initial flowpath 200.

When the valve 10 is open, the user turns the handle 61 in the direction opposite the direction used to open the valve 10 to close the valve 10. Typically, to close the valve 10 the user turns the handle 61 in the clockwise direction. When both the first and second valve assemblies 14, 16 are in the open position, turning the handle 61 causes the second valve assembly 16 to rotate within the first valve assembly 14 and move between third position, through the second, open position and into the first, closed position. The second valve assembly 16 moves prior to the first valve assembly 14 due to the low friction coating 122. Once the second valve assembly 16 is in the first, closed position, the second valve assembly sealing member 120 contacts the first valve assembly body 80. As such, further rotation of the handle 61 causes the first valve assembly 14 to rotate in the housing assembly 12 and move between the second, open position and the first, closed position. Accordingly, the valve 10 is closed and fluid may not flow through either the initial or primary flowpaths 200, 202.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A valve comprising:
    a housing assembly having an inlet in fluid communication with an inlet passage, an outlet in fluid communication with an outlet passage and a valve chamber, said inlet passage and said outlet passage each in fluid communication with said valve chamber;
    a stem assembly rotatably disposed within said housing assembly, said stem assembly having an exposed handle extending out of said housing assembly and a second end disposed within said valve chamber;
    a surge suppression device comprising:
        an initial flowpath between said inlet and said outlet;
        a primary flowpath between said inlet and said outlet;
        a first valve assembly coupled to said stem assembly and threadably engaging said housing assembly and structured to move between a first, closed position wherein said primary flowpath is blocked and a second, open position wherein said primary flowpath is not blocked;
        a second valve assembly threadably coupled, indirectly, to said housing assembly and structured to move between a first, closed position wherein said initial flowpath is blocked and a second, open position wherein said initial flowpath is not blocked;
        wherein said second valve assembly is threadably coupled, indirectly, to said first valve assembly;
        said stem assembly second end is coupled to said second valve assembly; and
        upon rotation of said stem assembly, said second valve assembly is structured to rotate relative to said first valve assembly prior to said first valve assembly rotating relative to said housing assembly.

2. The valve of claim 1 wherein said second valve assembly threadably engages said first valve assembly and said second valve assembly is structured to move between said first and second positions prior to said first valve assembly moving between said first and second positions.

3. The valve of claim 2 wherein
    said valve chamber includes internal threads;
    said first valve assembly includes a body having an outer threaded surface; and
    said first valve assembly outer threaded surface is structured to engage said valve chamber internal threads.

4. The valve of claim 3 wherein
    said first valve assembly is cup-shaped having a disk and a sidewall defining an upwardly opening cavity, said cavity having an inner threaded surface;
    said second valve assembly includes a body having an outer threaded surface; and
    said second valve assembly outer threaded surface is structured to engage said cavity inner threaded surface.

5. The valve of claim 4 wherein
    said first valve assembly disk includes a micro-passage and
    said second valve assembly includes a sealing member structured to engage said micro-passage; and
    said micro-passage being part of said initial flowpath.

6. The valve of claim 5 wherein said micro-passage has a cross-section area between about 0.00000707 and 0.0000283 in$^2$.

7. The valve of claim 5 wherein said micro-passage has a cross-section area of about 0.0000283 in$^2$.

8. The valve of claim 5 wherein
    said first valve assembly includes a sealing member structured to engage the periphery of said first inlet passage and having a central opening therethrough;
    said central opening aligned with said micro-passage.

9. The valve of claim 8 wherein a filter is disposed in said initial flowpath.

10. The valve of claim 8 wherein said first valve assembly includes a filter in fluid communication with said micro-passage and wherein said initial flowpath extends through said filter.

11. The valve of claim 2 wherein a filter is disposed in said initial flowpath.

12. The valve of claim 11 wherein said first valve assembly includes a micro-passage and a filter in fluid communication with said micro-passage and wherein said initial flowpath extends through said filter and said micro-passage.

13. The valve of claim 2 wherein
    said first valve assembly threadably engages said housing assembly, said first valve assembly having a body with a disk, a sidewall forming an upwardly opening threaded cavity, an upper stop means, a micro-passage through said disk, and a sealing member;
    said first valve assembly structured to move between a first position wherein said first valve seal member sealingly engages the periphery of said inlet passage and a second position wherein said first valve seal member is spaced from said inlet passage;
    said upwardly opening, threaded cavity in fluid communication with said valve chamber;
    said micro-passage extending between, and in fluid communication with, said inlet passage and said upper, treaded cavity;
    a second valve assembly disposed within, and threadably engaging, said upper, threaded cavity, said second valve assembly having a sealing member and a stem assembly coupling, said second valve assembly further coupled to said stem assembly second end;
    said second valve assembly structured to move between a first position wherein said second valve seal member sealingly engages said micro-passage and a second position wherein said second valve seal member is spaced from said micro-passage; and wherein rotation of said stem assembly initially causes said second valve member to rotate in said upper, threaded cavity until said second valve member either engages said upper stop means or said second seal member engages said micro-passage, whereupon rotation of said stem assembly causes said first valve member to rotate and thereby move between said first valve first position and said first valve second position.

14. The valve of claim 13 wherein the surface of said valve chamber adjacent said first valve assembly includes threads structured to engage said first valve assembly.

15. The valve of claim 14 wherein said upper, threaded cavity threads are structured so that said stem assembly must be turned more than 360 degrees to move said second valve assembly between said first position and contacting said stop means.

16. The valve of claim 14 wherein a friction reducing coating is disposed between said first valve assembly and said second valve assembly.

17. The valve of claim 16 wherein a filter is disposed in said initial flowpath.

18. The valve of claim 17 wherein said first valve assembly includes a filter in fluid communication with said micro-passage and wherein said initial flowpath extends through said filter.

19. The valve of claim 18 wherein said micro-passage has a cross-section area between about 0.00000707 and 0.0000283 in$^2$.

20. The valve of claim 18 wherein said micro-passage has a cross-section area of about 0.0000283 in$^2$.

21. The valve of claim 1 wherein there is a low-friction coating disposed between said first valve assembly and said second valve assembly.

22. A high pressure gas cylinder having a valve with a pressure rate reduction device comprising:
a rigid housing having at least one opening therethrough;
a valve coupled to said housing at said opening, said valve comprising:
a housing assembly having an inlet in fluid communication with an inlet passage, an outlet in fluid communication with an outlet passage and a valve chamber, said inlet passage and said outlet passage each in fluid communication with said valve chamber;
a stem assembly rotatably disposed within said housing assembly, said stem assembly having an exposed handle extending out of said housing assembly and a second end disposed within said valve chamber;
a pressure rate reduction device comprising:
an initial flowpath between said inlet and said outlet;
a primary flowpath between said inlet and said outlet;
a first valve assembly coupled to said stem assembly and threadably engaging said housing assembly and structured to move between a first, closed position wherein said primary flowpath is blocked and a second, open position wherein said primary flowpath is not blocked; and
a second valve assembly threadably coupled to said housing assembly and structured to move between a first, closed position wherein said initial flowpath is blocked and a second, open position wherein said initial flowpath is not blocked;
wherein said second valve assembly is threadably coupled to said first valve assembly;
said stem assembly second end is coupled to said second valve assembly; and
upon rotation of said stem assembly, said second valve assembly is structured to rotate relative to said first valve assembly prior to said first valve assembly rotating relative to said housing assembly.

23. The cylinder of claim 22 wherein said second valve assembly threadably engages said first valve assembly and said second valve assembly is structured to move between said first and second positions prior to said first valve assembly moving between said first and second positions.

24. The cylinder of claim 23 wherein
said first valve assembly threadably engages said housing assembly, said first valve assembly having a body with a disk, a sidewall forming an upwardly opening threaded cavity, an upper stop means, a micro-passage through said disk, and a sealing member;
said first valve assembly structured to move between a first position wherein said first valve seal member sealingly engages the periphery of said inlet passage and a second position wherein said first valve seal member is spaced from said inlet passage;
said upwardly opening, threaded cavity in fluid communication with said valve chamber;
said micro-passage extending between, and in fluid communication with, said inlet passage and said upper, treaded cavity;
a second valve assembly disposed within, and threadably engaging, said upper, threaded cavity, said second valve assembly having a sealing member and a stem assembly coupling, said second valve assembly further coupled to said stem assembly second end;
said second valve assembly structured to move between a first position wherein said second valve seal member sealingly engages said micro-passage and a second position wherein said second valve seal member is spaced from said micro-passage; and
wherein rotation of said stem assembly initially causes said second valve member to rotate in said upper, threaded cavity until said second valve member either engages said upper stop means or said second seal member engages said micro-passage, whereupon rotation of said stem assembly causes said first valve member to rotate and thereby move between said first valve first position and said first valve second position.

* * * * *